Figure 6:
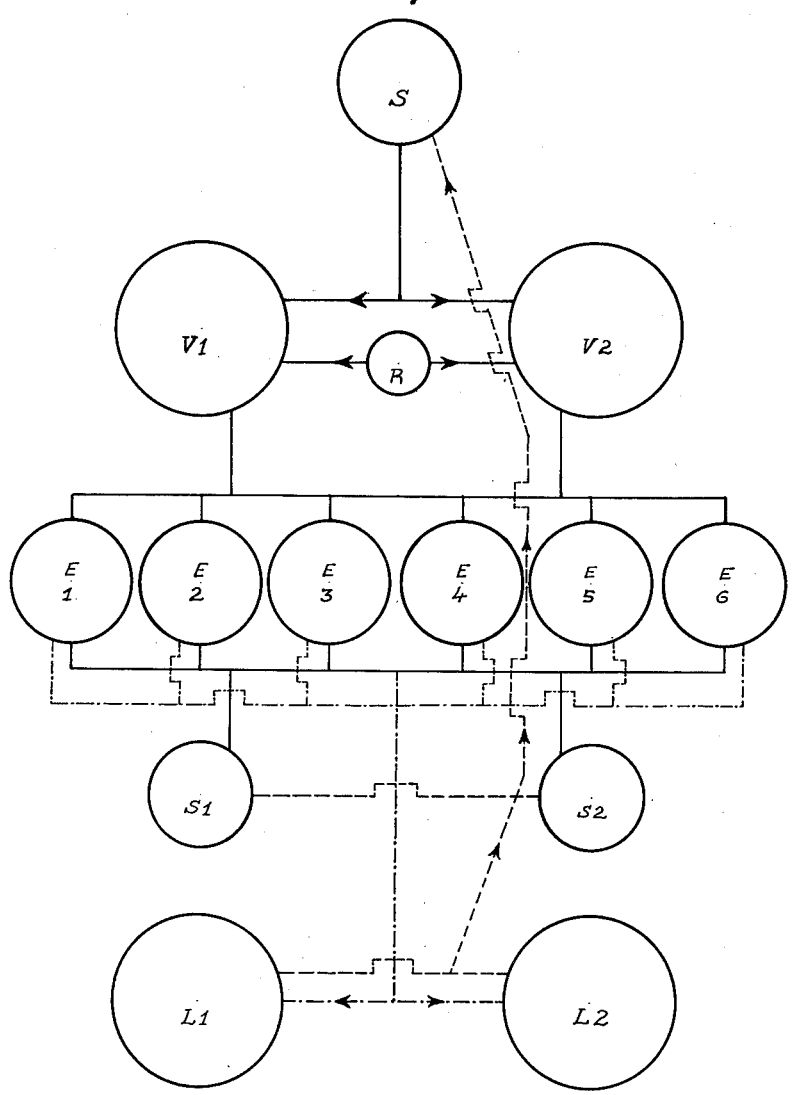

May 21, 1935.　　　　S. C. DARÁNYI　　　　2,001,930
PROCESS AND APPARATUS FOR THE FERMENTATION OF CARBOHYDRATES
Filed Oct. 5, 1931　　　3 Sheets-Sheet 1
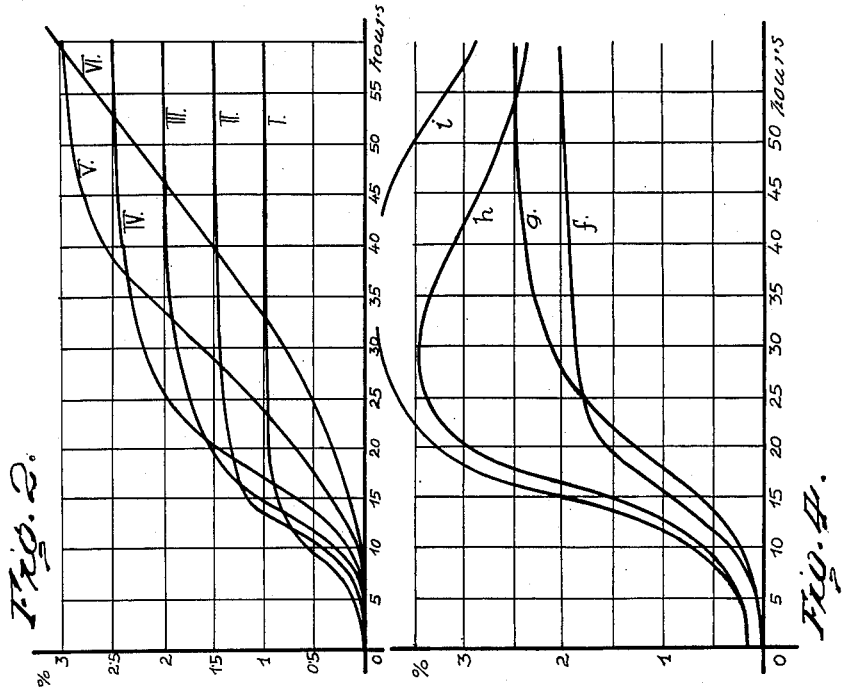
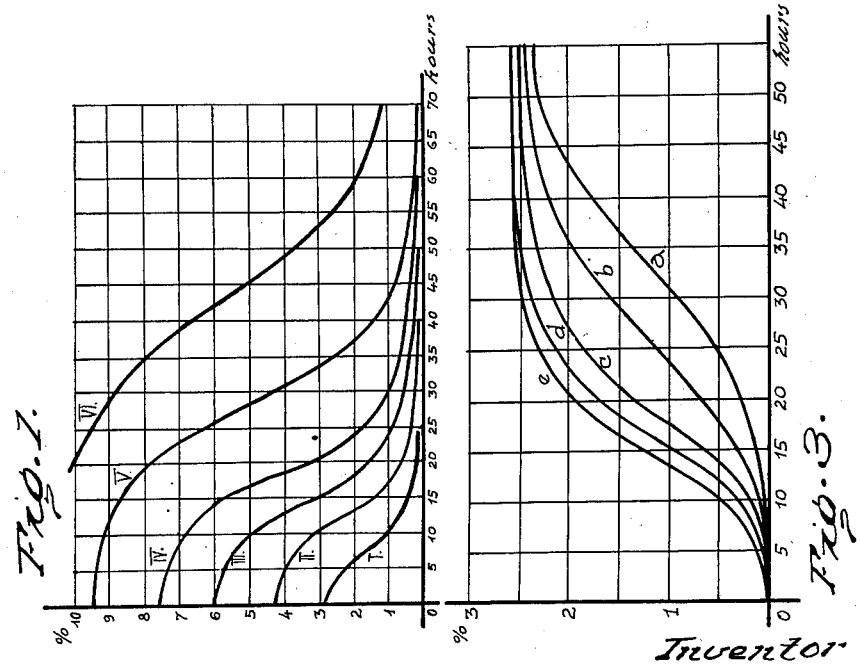
Inventor
S. C. Darányi
Atty.

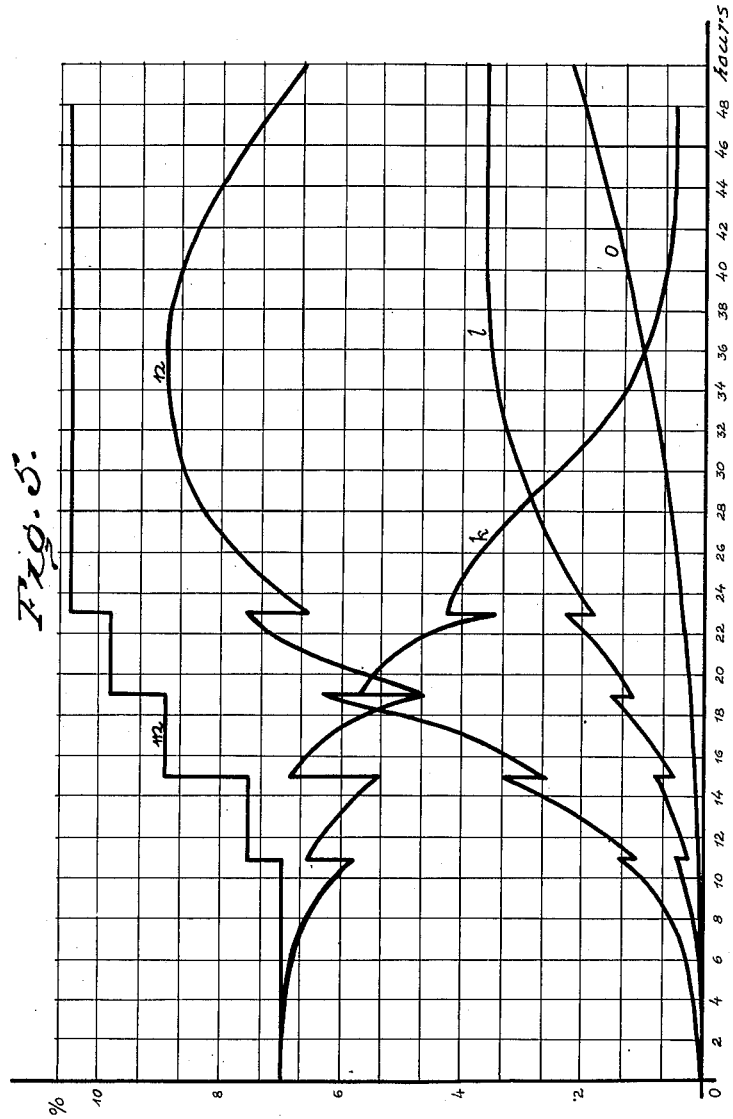

May 21, 1935. S. C. DARÁNYI 2,001,930
PROCESS AND APPARATUS FOR THE FERMENTATION OF CARBOHYDRATES
Filed Oct. 5, 1931 3 Sheets-Sheet 3

Inventor
S. C. Darányi
By [signature]
Atty.

Patented May 21, 1935

2,001,930

UNITED STATES PATENT OFFICE 2,001,930

PROCESS AND APPARATUS FOR THE FERMENTATION OF CARBOHYDRATES

Stephan Carl Darányi, Hamburg, Germany

Application October 5, 1931, Serial No. 567,107
In Germany March 20, 1931

10 Claims. (Cl. 260—135)

This invention relates to improvements in process and apparatus for the acetone-butyl alcoholic fermentation of carbohydrates.

The so-called acetone-butyl alcoholic fermentation of carbohydrates is becoming of increasing importance in the fermentation industry. The agents producing this bacterial fermentation, namely the bacteria belonging to the amylobacterial group, are very widely distributed in nature, chiefly in the soil and in products of the soil and the like. Their cultivation can be carried out by the customary bacteriological methods without difficulty. The hitherto known bacteria are scarcely distinguished from one another either morphologically or biochemically; any slight differences which occur must actually be considered as the result of the different cultivation methods, nutritive media and the like. As regards the biochemical behaviour of these numerous known types it is particularly characteristic that they can all be well suited to industrial requirements and in particular the theoretically attainable yield of acetone and butyl alcohol with each of them can be almost equally attained. The chief products, butyl alcohol, acetone and ethyl alcohol are likewise formed in substantially the same characteristic proportion of 6:3:1 and also the quantity proportion of the fermentation gases, carbon dioxide and hydrogen, is practically constant.

Among known processes is one in which an aseptic wort of initial concentration 8% is fermented until preferably about 70–80% of the carbohydrates have been transformed into butylacetonic products, whereupon a relatively small amount of non-aseptic wort of the same initial concentration is added and fermentation allowed to proceed to the same point at which the addition was made, whereupon an equal quantity of the wort is removed and a similar addition made as before, the operations being repeated as often as practicable. Other processes are also known in which fermented wort is added to fresh wort to induce fermentation.

As regards yield it is true that the customary processes require no improvement. When however one comes to consider the disadvantages in the industrial process these consist in particular in the fact that on the one hand the concentration of the "solvent" obtained is considerably below the result of the other fermentation processes and on the other hand the yield produced per unit time and volume is relatively small.

The new process of the present invention has for its object the production of the fermentation products in a higher concentration than hitherto with a better utilization of the fermentation vessels from the point of view of space. Before proceeding to define the new process in detail it will be well to discuss the considerations from which the process was deduced.

Experiments carried out in order to establish the relation between the concentration of the raw material, the rate of fermentation, the degree of fermentation, the multiplication and yielding capacity of the bacteria and the like, led to the following conclusions.

(a) The initial fermentation, main (normal) fermentation and after-fermentation are modified from the point of view of time with increasing concentration of raw material in such a manner that on exceeding a certain concentration the duration of the full fermentation would be practically infinite.

(b) The slow and sluggish fermentation taking place in many cases can only to some extent be traced to the poisonous action of the fermentation products. On the other hand the course of the fermentation and the rate of fermentation are dependent to a high degree on the concentration of raw material. If for example the fermentation products formed do not yet hinder the fermentation to any marked extent, however at the same time the concentration of raw material has already sunk considerably, then the intensity of the fermentation diminishes to such a large extent that the after fermentation in relation to the main fermentation takes up much too long a time. With a high concentration on the other hand the fermentation sets in too slowly and continues too sluggishly although in this case the concentration of the poisonous substances can obviously not yet come into question.

(c) Both the rate of fermentation and the degree of fermentation are in close relation to the comparative concentration ratios of the inoculation mash (in which the bacteria were cultivated or multiplied) and the main mash.

(d) The rate of fermentation increases with the number of living bacteria. This number increases rapidly in the mash even before the main fermentation whereas the rate of fermentation attains to its highest point prior to the conclusion of the main fermentation. From this point onwards the rate of multiplication slackens and shortly afterwards commences the decrease in the number of living cells. Within certain limits, towards the optimum condition, the number of living bacteria per unit volume increases with the increasing concentration of raw material.

These experimental results are graphically illustrated in Figures 1-4 of the drawings.

Figures 1 and 2 illustrate the course of the fermentation from the point of view of time with varying initial concentrations of carbohydrates. In Figure 1 the abscissa represents the duration of fermentation in hours and the ordinate the carbohydrate content of the fermenting mash in per cent. Curve I shows the actual carbohydrate concentration observed at any time in the fermentation of mashes with an initial carbohydrate content of 2.9% as a function of the duration of fermentation, Curve II the same at an initial concentration of 4.3% and Curves III-VI at 6%, 7.5%, 9.5% and 11%.

In Figure 2 the abscissa again illustrates the time of fermentation while the ordinate shows the concentrations of the fermentation products produced (butyl alcohol, acetone and the like) in the fermentation of mashes with differing initial concentrations, in per cent of the mash, as a function of the time of fermentation. The Curves I-VI illustrate the fermentation ratios of mashes of the same initial concentration as according to Figure 1.

Figure 3 shows how the course of fermentation of a main mash of an initial concentration of 7.5% is influenced by the initial carbohydrate content of the inoculation mash. The curves $a-e$ illustrate the proportions with a starting concentration of the initial mash of 4.5, 5, 7.5, 10, and 11.5%. They give the concentration of the fermentation products contained in the fermenting mash (acetone, butyl alcohol, ethyl alcohol and the like) in per cent of the mash as a function of the time of fermentation.

The curves $f$ and $g$ in Figure 4 illustrate the rising of the concentration of the fermentation products, while the curves $h$ and $i$ show the multiplication of the bacteria in a mash with an initial carbohydrate concentration of 6 and 7.5% as a function of the time of fermentation. The curves $f$ and $h$ relate to a mash with an initial concentration of 6, the curves $g$ and $i$ to one with 7.5%. In the case of the curves illustrating the multiplication of the bacteria there serves as unit the initial number of bacteria in one unit volume of the mash. This unit is the same for both mashes.

These experimental results illustrated in the graphs were utilized in the framing of the new process.

In accordance with the present invention a sterilized mash which is still fermentable and having a carbohydrate content of about 7% is inoculated in the customary manner with a bacterial culture found to be suitable. Bacteria are preferably employed for this purpose which have been cultivated in a mash of higher carbohydrate concentration, this mash being in a condition of main fermentation. As soon as the main fermentation has set up in the inoculated mash, such a quantity of a sterile mash of higher carbohydrate concentration is added to it as the starting mash, in one or more charges (i. e. intermittently) or continuously, that, referred to the unit volume of the mash, the total (that is to say the already fermented and the hitherto unfermented) carbohydrate content rises to about 1.4 to 1.5 times the initial concentration. During the addition of the more highly concentrated mash care must be taken that the content in the mash of unfermented carbohydrate thus produced does not exceed the original, in the present case 7% concentration of the starting mash. By this means on the one hand the otherwise injurious action of the higher concentration is excluded and on the other hand the utilization of the maximum rate of fermentation during the main fermentation is rendered possible. At the same time by increase of the concentration of raw materials the multiplication of the bacteria is favoured to a high degree. In this manner with the same volume content and practically the same duration of fermentation about 1.4-1.5 times the hitherto employed quantity of raw material is worked up whereby also the concentration in the fermented mash of butyl alcohol-acetone-ethyl alcohol rises to 1.4-1.5 times. The concentrations given by way of example both of the starting mash and of that subsequently introduced can be varied by increase or decrease. Also the subsequently introduced higher concentrated mash can be prepared from a different raw material than that employed for the starting mash.

The concentration and time relations observed in the new fermentation process together with the proportional numbers of the living bacteria compared with the simple processes are seen from Graph 5 of the drawings.

Figure 5 illustrates the course of the fermentation of the mash in accordance with the process of the present invention. The curve $k$ shows the actual carbohydrate concentration of the mash at any time, curve $l$ the concentration of the fermentation products produced (acetone, butyl alcohol, ethyl alcohol and the like), curve $m$ the concentration of the total carbohydrates introduced into the mash throughout the process that is to say, fermented and unfermented in per cent, and finally, curve $n$ shows the number of bacteria present per unit volume of the mash at any time expressed as the multiple of the number ascertainable at the commencement of the fermentation, as a function of the time of fermentation. The curve $o$ shows the increase of the concentration of fermentation products, in relation to the hitherto customary process, with such an initial concentration of the mash as is equal to the highest value in accordance with the invention of the concentration of the total fermented and unfermented carbohydrates.

After completion of the fermentation there remains in the fermented mash, as is also seen from the graph in Figure 1, a certain quantity of fermentable carbohydrates. With the application of more highly concentrated mashes this unfermented residue is also proportionally larger. Correspondingly the quantities of unfermented carbohydrates remaining per unit volume of the fermented mash, although the degree of fermentation, in spite of the high "solvent" concentration of about 3.5, is not altered, likewise amount to about 1.4-1.5 times as much as with correspondingly diluted mashes.

For the reduction of the carbohydrate losses and for the fermentation of the residue, the liquor remaining after distillation and still containing about 0.6-1% of carbohydrates can be employed in the steamer for mashing fresh raw material, the carbohydrate content of the residual liquor being accounted for in the initial concentration of the mash to be prepared. In this manner the carbohydrate loss is reduced to a corresponding fraction of the loss occuring during a fermentation process by as many times as the residual liquor is returned to the process. This can according to the nature of the raw material be 3-6 times and if mechanical, chemical or both types of purification of the residual liquor are effected, even more times, so long as the substances which are non-fermentable and which increase the viscosity and hinder the fermentation process do not accumulate to a great extent. This method of working has the advantage that the remains of decayed bacteria contained in the residual liquor serve as a nutrient medium in the next fermentation for the building up of the new organisms so that for this purpose less fermentable raw material is used up.

The following examples illustrate the invention:—

Example 1

7000 kg. of potatoes (with a starch content of about 20%) are steamed at a pressure of 2–3 atmospheres with so much water that finally, about 20,000 litres of mash are obtained. This is then blown through a super-heating tube into a closed, sterilized fermentation vessel provided with stirring apparatus and cooler. At the same time into the fermentation vessel with stirring and maintaining a temperature of 80–90° C. about 1/3 of the prepared inoculation material is introduced. As inoculation material is employed a strongly fermenting mash with an original content of about 50–60% of potatoes, equal to 10–12% of starch. After stirring for one quarter to half an hour the mash is rapidly cooled to 36–37° C. and the other two-thirds of the inoculant are added. With maintenance of the temperature of 36–37° C. the mash undergoes in 10 to 12 hours a strong fermentation, whereupon it is displaced into a second similarly fitted sterile fermentation vessel of about double the content, into which at the same time 2000 litres of a highly concentrated sterile mash prepared in the meantime and cooled to about 36–37° C. are introduced. The preparation of this mash takes place in a second autoclave with so much water that the starch concentration amounts to 14–15% (about 70% potato). Thereupon at intervals of 5–7 hours two further amounts of 9000 litres, or at intervals of 3–4 hours 3 further amounts of 6000 litres, of an equally highly concentrated mash are added. The mash, in this manner increased to a quantity of 40,000 litres, requires a fermentation time of about 18–25 hours. After completion of the fermentation the liquid contains 3.6–3.8% of "solvents", that is to say, butyl alcohol, acetone and ethyl alcohol in the customary proportion of 6:3:1.

As inoculation material preferably a culture of a suitable type of bacteria is employed which has been multiplied, with increase of the concentration in stages, finally in a mash containing 50–60% of potatoes. Also a fraction of the main mash itself can be employed as inoculant in such a condition that its total carbohydrate content has already attained to the highest value but not two thirds of the total carbohydrates have been fermented.

It may be remarked that the higher concentrated inoculation mash can be produced, if desired, from a different raw material from that of the starting mash.

Example 2

The residue from distillation contains as already mentioned together with about 0.6 to 1% of still fermentable carbohydrate about 2–3% of other substances in part applicable as nutrient medium for the bacteria. 6,500 kg. of potatoes are steamed with 12,000 litres of this residual liquor at 2–3 atmospheres, the whole diluted to 20,000 litres and fermented in the manner described in Example 1. For the production of the concentrated 60–70% mash to be added a further 5000 litres of the residual liquor are employed. In this manner about two-fifths of the total residual liquor is returned to the process.

In the application of another raw material, for example maize, four-fifths of the total residual liquor may be utilized in the described manner.

After use for 3–5 times the unfermentable substances in the residual liquor accumulate to such an extent that without mechanical (clarification, settling) or chemical purification it cannot be re-employed in the fermentation according to Examples 1 and 2. However, this thick residual liquor can be again mashed with molasses, beet or other raw material to a content of about 6% of carbohydrate, again fermented and after distillation employed as a highly valuable nutrient medium.

The process can suitably be carried out in an apparatus schematically illustrated in Figure 6.

From the steamer S two fermentation vessels $V_1$ and $V_2$ are alternatively fed with the initial mash. R serves for the cultivation and preparation of the bacterial mash to be employed for inoculation. From the vessels $V_1$ and $V_2$ after about 10 hours fermentation the mash is displaced into one of the parallel connected and separately isolatable vessels $E_1$–$E_6$, into which the higher concentrated mash is introduced from the steamers $S_1$, $S_2$. From the vessels $E_1$–$E_6$ the fermented mash is transferred into the stills $L_1$–$L_2$. From here the required quantity of residual liquor from the distillation is taken back into the steamer S or $S_1$–$S_2$. The number of the separate elements (fermentation vessels, steamers, stills and the like) can be selected in various ways, as also the transportation of the mashes can be effected in any suitable manner, for example by means of the pressure of the fermentation gases and the like.

It was found that the yields of solvents obtainable with the present process and also the course of the fermentation process remained the same when as active agent a type of bacteria was employed already applied in the industry or cultivated according to any of the customary methods. Good results were produced for example with a culture cultivated in the following manner:—

10 kg. of ground potatoes are mixed with 15 litres of water and 5 grams of potassium carbonate. The uniform thin broth is distributed between 50 flasks and 45 of the same sterilized at a pressure of 2–3 atmospheres. After the sterilization into each of separate batches of five flasks is sprinkled humus of varying origin from beet, rutabaga, chaff of different cereals and the like and they are thereupon placed with the five unsterilized flasks in thermostats of 34—35—36—37—38° C. respectively, each flask with the same starting material being maintained at one of the different temperatures. After about 48–60 hours the tests having the odour of butyl alcohol are isolated, separate portions of 50 ccs. thereof are poured into flasks containing sterile potato liquors similar to the starting material and after thorough mixing brought back into the corresponding thermostats. After fermentation for 3 days, from the 200–300 ccs. taken from the separate flasks the butyl alcohol, ethyl alcohol and acetone are distilled off. The content of the flask found to be the most favourable is then employed for the cultivation of pure cultures. With colonies obtained by customary methods for example by the anaerobic plate method and apparently produced from one cell in each case two Freudenreich flasks filled with sterile potato liquor are inoculated and these are thereupon again returned to the thermostats. After about 2 days the contents of these flasks are separately introduced into each of separate flasks containing 250 ccs. of sterile potato liquor and after fermentation for 2½ days the most promising is again separated. When the fermentation capacity of these cultures in several successive tests appears to be satisfactory, they are, after multiplication and application by the ordinary technique employed in bacteriology, introduced into the fermentation process.

Various changes may be made in the details disclosed in the foregoing specification without departing from the invention or sacrificing the advantages thereof.

I claim:—

1. A method of producing butyl alcohol and acetone by bacterial fermentation of carbohydrates, consisting in inoculating an aseptically prepared, carbohydrate-containing mash with butyl alcohol and acetone producing bacteria, bringing it into vigorous fermentation, adding to the fermenting mash a further, also aseptically prepared mash having a higher carbohydrate concentration than the fermenting mash initially had, in quantity so that the total carbohydrate concentration, calculated on the fermented and unfermented carbohydrates, of the mash mixture resulting after the addition exceeds the total carbohydrate concentration of the initial mash, but its actual unfermented carbohydrate concentration does not rise above the initial total carbohydrate concentration of the starting mash, but is equal to that at the most, and then continuing the fermentation until completion.

2. A method of producing butyl alcohol and acetone by bacterial fermentation of carbohydrates, consisting in inoculating an aseptically prepared, carbohydrate-containing mash with butyl alcohol and acetone producing bacteria, bringing it into vigorous fermentation, adding to the fermenting mash a further, also aseptically prepared mash having a higher carbohydrate concentration than the fermenting mash initially had, in quantity such that the total carbohydrates concentration, calculated on fermented and unfermented carbohydrates, of the mash mixture resulting after the addition is 1.4 to 1.5 times the total carbohydrate concentration of the starting mash, but its actual unfermented carbohydrate concentration does not rise above the initial total carbohydrate concentration of the starting mash, but is equal to that at the most, and then continuing the fermentation until completion.

3. A method of producing butyl alcohol and acetone by bacterial fermentation of carbohydrates, consisting in inoculating an aseptically prepared, carbohydrate-containing mash with butyl alcohol and acetone producing bacteria, bringing it into vigorous fermentation, intermittently adding to the fermenting mash a further, also aseptically prepared mash having a higher carbohydrate concentration than the fermenting mash initially had, adjusting the additions of concentrated mash made in the intervals so that the total carbohydrate concentration, calculated on fermented and unfermented carbohydrates, of the mash mixture resulting after the additions exceeds the total carbohydrate concentration of the initial mash, but its actual unfermented carbohydrate concentration does not rise above the initial total carbohydrate concentration of the starting mash, but is equal to that at the most, and then continuing the fermentation until completion.

4. A method of producing butyl alcohol and acetone by bacterial fermentation of carbohydrates, consisting in inoculating an aseptically prepared, carbohydrate-containing mash with butyl alcohol and acetone producing bacteria, bringing it into vigorous fermentation, intermittently adding to the fermenting mash a further, also aseptically prepared mash of higher carbohydrate concentration than the starting mash had, adjusting the intermittently made additions of concentrated mash so that the actual unfermented carbohydrate concentration does not rise above the initial total carbohydrate concentration of the starting mash, but is equal to that at the most, continuing the addition of the higher carbohydrate concentrated mash in charges until at last the total carbohydrate concentration, calculated on fermented and unfermented carbohydrates, of the resulting mash mixture is 1.4 to 1.5 times the initial carbohydrate concentration of the starting mash, and then continuing the fermentation until completion.

5. A method of producing butyl alcohol and acetone by bacterial fermentation of carbohydrates, consisting in inoculating an aseptically prepared, carbohydrate-containing mash with butyl alcohol and acetone producing bacteria, bringing it into vigorous fermentation, adding to the fermenting mash in a continuous manner a further, also aseptically prepared mash of a higher carbohydrate concentration than the starting mash had, adjusting the amount and rate of addition of the continually introduced concentrated mash so that its actual unfermented carbohydrate concentration does not rise above the initial total carbohydrate concentration of the starting mash, but is equal to that at the most, continuing the introduction of the higher carbohydrate concentrated mash until at last the total carbohydrate concentration, calculated on the fermented and unfermented carbohydrates, of the resulting mash mixture is 1.4 to 1.5 times the initial concentration of the starting mash, and then continuing the fermentation until completion.

6. A method of producing butyl alcohol and acetone by bacterial fermentation of carbohydrates, consisting in inoculating an aseptically prepared, carbohydrate-containing mash with butyl alcohol and acetone producing bacteria, bringing it into vigorous fermentation, adding to the fermenting mash a further mash, also aseptically prepared, but obtained from a different raw material than that of the initial mash, and being of higher carbohydrate concentration than was the starting mash, in quantity such that the total carbohydrate concentration, calculated on fermented and unfermented carbohydrates, of the mash mixture resulting after the addition exceeds the initial carbohydrate concentration of the starting mash, but its actual unfermented carbohydrate concentration does not rise above the initial total carbohydrate concentration of the starting mash, but is equal to that at the most, and then continuing the fermentation until completion.

7. A method as claimed in claim 1, in which the fermentation is initiated by inoculation with a bacterial culture of a type producing butyl alcohol and acetone prepared in a carbohydrate mash containing more than 10% of carbohydrates by the ordinary technique employed in bacteriology.

8. A method as claimed in claim 1, in which after completion of the fermentation, the fermentation products are separated from the mash by distillation, and the liquor remaining after distillation is employed instead of water for the production of a mash to be used in the process.

9. In a method as claimed in claim 1, the step of employing for the inoculation of the aseptically prepared, carbohydrate-containing mash, a mash taken from a previous fermentation process at a stage of the fermentation at which the total carbohydrate concentration is already a maximum, but about ⅓ of the total carbohydrates introduced remains unfermented.

10. A method of producing butyl alcohol and acetone by bacterial fermentation of carbohydrates with the recovery of a fermented product having a so-called "solvent"-content of about 3.6%, consisting in inoculating an aseptically prepared mash having a carbohydrate-content of about 7%, at a temperature of 36–37° C., with a bacterial culture of a type producing butyl alcohol and acetone, bringing the mash into vigorous fermentation, intermittently adding to the partly fermented mash, with maintenance of the fermentation temperature and of the fermentation, an also aseptically prepared further mash, having a carbohydrate concentration of about 14%, in quantities which are at first only small, amounting to ⅛ to 1/16 of the starting mash of about 7% carbohydrate concentration, and thereafter at 3 to 6 hour intervals in larger quantities, amounting to ⅓ to ⅙ of the starting mash of about 7% carbohydrate concentration, the additions being continued until the total amount of mash by volume attains to about double the amount of the starting mash by volume, whereupon the fermentation is continued until at the most 1% of unfermented carbohydrates will be left in the mash, then the "solvents" are separated by distillation, and the liquor remaining after distillation is employed instead of water for the production of further mash.

STEPHAN CARL DARÁNYI.